May 1, 1962 W. M. MUZZEY 3,031,686
SLEEP INDUCING DEVICES
Filed Nov. 18, 1957 5 Sheets-Sheet 1

INVENTOR
WARREN M. MUZZEY
BY Rey Eilers
ATT'Y.

May 1, 1962 W. M. MUZZEY 3,031,686
SLEEP INDUCING DEVICES
Filed Nov. 18, 1957 5 Sheets-Sheet 2

INVENTOR
WARREN M. MUZZEY
BY Rey Eilers ATT'Y.

FIG.11  FIG.12  FIG.13

INVENTOR
WARREN M. MUZZEY

FIG. 15

INVENTOR
WARREN M. MUZZEY
BY Ray Eilers
ATT'Y.

United States Patent Office 3,031,686
Patented May 1, 1962

3,031,686
SLEEP INDUCING DEVICES
Warren M. Muzzey, St. Louis County, Mo.
(R.R. 4, Box 139A, St. Charles, Mo.)
Filed Nov. 18, 1957, Ser. No. 697,077
6 Claims. (Cl. 5—109)

This invention relates to improvements in sleep-inducing devices. More particularly, this invention relates to improvements in sleep-inducing devices that can be attached to cradles, cribs or beds or the like.

It is therefore an object of the present invention to provide an improved sleep-inducing device that can be attached to a cradle, crib or bed or the like.

Traditionally, a gentle movement of a cradle, crib or bed or the like induces sleep for the occupant. It is usually a relatively simple and convenient matter to effect gentle movement of a cradle, crib or bed or the like, and thereby induce sleep for the occupant, when one is awake and has sufficient free time to do so. However, there are many times during any given twenty four hour period when one is not awake or, if awake, does not have sufficient free time to effect gentle movement of the cradle, crib or bed or the like. At such times, the occupant of the cradle, crib or bed or the like can feel neglected and can become both restless and vocal. Where the occupant of the cradle, crib or bed or the like becomes sufficiently restless and vocal, someone usually has to get up out of bed or put aside some task and effect the requisite sleep-inducing gentle movement of the cradle, crib or bed or the like. The present invention provides a sleep-inducing device that can be attached to the cradle, crib or bed or the like and that can automatically effect the desired sleep-inducing gentle movement whenever the occupant of the cradle, crib or bed or the like either becomes vocal or becomes restless. Such a device avoids needless interruptions in the daily routine, and it also avoids needless interruptions in one's sleep. It is therefore an object of the present invention to provide a sleep-inducing device that automatically provides gentle movement of a cradle, crib or bed or the like when the occupant becomes restless or vocal.

In one embodiment of the present invention, the noises of the occupant of the cradle, crib or bed or the like are utilized to start a motor, and that motor supplies the desired sleep-inducing gentle movement of the cradle, crib or bed or the like. Once the motor has been started, a timing device keeps the motor energized for a predetermined period of time and thereafter permits the motor to come to rest. Such an arrangement is desirable because it makes it possible for the sleep-inducing motion to be supplied to the cradle, crib or bed or the like for a period that is long enough to enable the occupant to go back to sleep but is short enough to avoid any adverse effects on the occupant. It is therefore an object of the present invention to provide a sleep-inducing device which responds to noises made by the occupant of a cradle, crib or bed or the like to start a motor running, and which keeps that motor running for a predetermined period and then subsequently de-energizes that motor.

The said one embodiment of the sleep-inducing device provided by the present invention can also transmit the noises, made by the occupant of the cradle, crib or bed or the like, to a loud speaker or to a radio receiving set in a different room. This is desirable because it not only enables the said one embodiment of the present invention to induce sleep but it also enables that embodiment to give notice that the occupant has awakened and has been induced to go back to sleep. It is therefore an object of the present invention to provide a sleep-inducing device that can also transmit the noises, made by the occupant of a cradle, crib or bed or the like, to a loudspeaker or to a radio receiving set in another room.

In another embodiment of the present invention, an inertia switch responds to movement of the occupant of the cradle, crib or bed or the like to start a motor operating; and that motor will supply the desired, sleep-inducing gentle movement to that cradle, crib or bed or the like for a predetermined period of time and then de-energize that motor. The inertia switch will be attached to the cradle, crib or bed or the like and will respond directly to the movement of the cradle, crib or bed or the like as the occupant awakens to start the motor. In this second embodiment of the present invention there will again be a timing device, and that timing device will make certain that the occupant of the cradle, crib or bed or the like has a full opportunity to go back to sleep. It is therefore an object of the present invention to provide a sleep-inducing device which has an inertia switch, which can be attached to a cradle, crib or bed or the like, and which can respond to movement of the occupant of the cradle, crib or bed or the like to energize a motor and provide sleep-inducing gentle movement for that cradle, crib or bed or the like.

Other and further objects and advantages of the present invention should become apparent from an examination of the drawing and accompanying description.

In the drawing and accompanying description, several preferred embodiments of the present invention have been shown and described but it is to be understood that the drawing and accompanying description are for the purpose of illustration only and do not limit the invention and that the invention will be defined by the appended claims.

In the drawing.

FIG. 12 is a wiring diagram of a loudspeaker which can be used with the control device shown in FIG. 11, FIG. 13 is a wiring diagram of a motion-imparting motor usable with the control device shown in FIG. 11.

Figure 1:
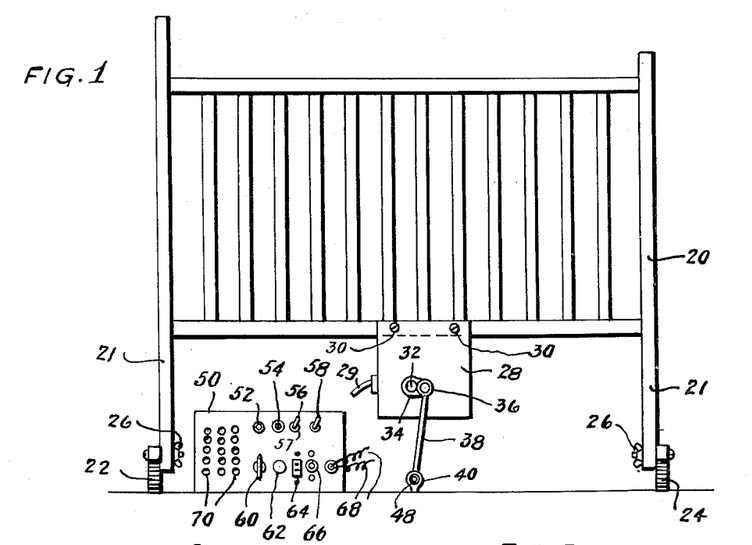
FIG. 1 is a front elevational view of a crib to which rockers have been attached and with which a sleep-inducing device has been associated.
Figures 2, 3:
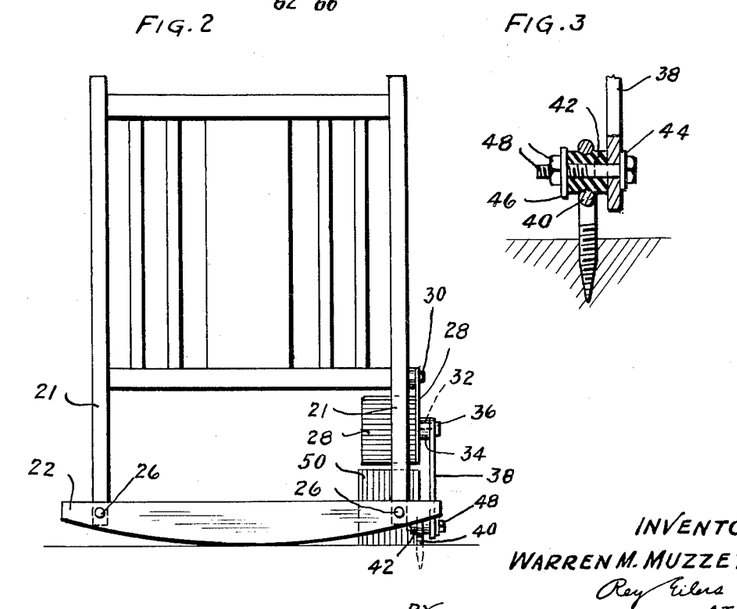
FIG. 2 is an end view of the crib and sleep-inducing device of FIG. 1.
FIG. 3 is an enlarged, sectional end view of the connector which secures the sleep-inducing device to the floor.

Referring to the drawing in detail, the numeral 20 denotes a crib of standard design and construction. While a crib is shown, it is to be understood that the present invention is applicable to cradles, cribs or beds or the like. The crib 20 has four legs 21; and a rocker 22 is secured to the legs at one end of the crib 20 while a rocker 24 is secured to the legs at the other end of that crib. The rockers 22 and 24 have large radii, and consequently they permit gentle rocking of the crib 20. To simplify the attachment of the rockers 22 and 24 to the legs 21 of the crib 20, openings are provided in those rockers and in those legs; and the bolts of wing nut and bolt combinations 26 are telescoped through those openings. Thereafter the wing nuts can be tightened to prevent accidental separation of those rockers from those legs.

The numeral 28 denotes a gear motor housing of standard design and construction, and that housing contains a gear motor, not shown. The housing 28 has a flange at the upper edge thereof, and that flange has openings through it to receive wood screws 30. Those screws extend through those openings and seat in a longitudinally-extending frame member of the crib 20.

An output shaft 32 projects outwardly from the housing 28, and that shaft rotates at low speed. A crank arm 34 is fixedly secured to the output shaft 32; and that crank arm carries a self-aligning bearing 36, of standard design and construction, at the outer end thereof. The bearing 36 supports one end of a connecting rod 38; and it permits free rotation of the crank arm 34 relative to that connecting rod while also permitting some tilting of that connecting rod relative to the axis of the output shaft 32.

An eye 40 of standard design and construction is threaded into an opening in the floor of the room in which the crib is to be used. A resilient sleeve 42, of rubber or the like, extends axially through that eye; and that sleeve has a stiff washer 46 at one end thereof and has the lower end of the connecting rod 38 at the other end thereof. A stiff washer 44 is disposed at the front face of the connecting rod 38; and a nut and bolt combination 48 interconnects the connecting rod 38 with the resilient sleeve 42 and with the washers 44 and 46. The resilient sleeve 42 permits both rotation and limited tilting of the connecting rod 38 relative to the eye 40 and to the floor.

The numeral 50 denotes a control box which contains an electronic control device; and that control device can determine when the motor in the gear motor housing 28 starts, and can also determine how long that motor will run. As that motor runs, it recurrently applies downward and upward forces to the connecting rod 38 and thus to the crib 20. Those recurrent downward and upward forces cause the crib 20 to rock gently on the rockers 22 and 24.

The numeral 52 denotes a jack mounted on the front wall of the control box 50; and that jack can receive a plug which is equipped with a short wire that serves as an antenna. The numeral 54 denotes an adjusting screw for a broadcast band oscillator coil, the numeral 56 denotes the handle of a single pole, single throw toggle switch 57, and the numeral 58 denotes the handle of a double pole, triple throw toggle switch. The numeral 60 denotes the control knob of a potentiometer, the numeral 62 denotes a fuse holder, the numeral 64 denotes a female receptacle, the numeral 66 denotes a jack for a plug connected to a loud speaker, the numeral 68 denotes wires that are connected to a male plug, and the numeral 70 denotes openings in the front wall of the control box 50.

Figure 4:
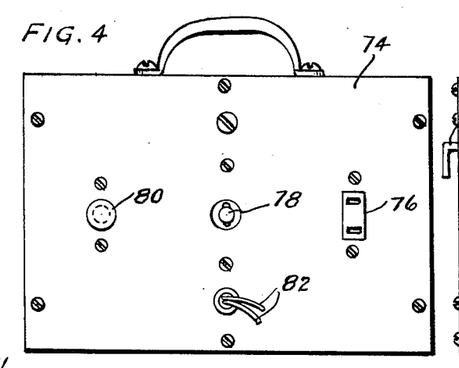
FIG. 4 is a front elevational view of a control box, for a sleep-inducing device, that can be associated with a cradle, crib or bed or the like, FIG. 5 is an end elevational view of the control box shown in FIG. 4.
Figure 5:
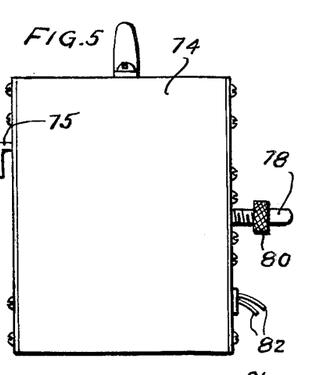

The numeral 74 denotes another control box, and that control box has a female receptacle 76, a handle 78 for a toggle switch, a set screw 80, and wires 82. In addition, the control box 74 has inverted, L-shaped projections 75 at the rear wall thereof; and those projections can telescope down over one of the longerons or end walls of the crib 20.

The numeral 86 denotes the rear wall of a housing for a motor-operated, motion-applying device. That housing is generally rectangular in form, and it includes end walls 90, front wall 92 and top 94. The rear wall 86 of the device is secured to the legs 21 at one end of the cradle, crib or bed or the like by wing nut and bolt combination 88; openings being provided in the rear wall 86 and in the legs 21 to accommodate the bolts of wing nut and bolt combinations 88.

A spacing block 96 is secured to the rear wall 86 of the motion-applying device, and a washer 98 is disposed at the front face of that block. A pivot 100, with an enlarged head, is telescoped through aligned openings in the rear wall 86 and in the block 96 and also through the washer 98; and that pivot rotatably supports a wheel 102. A washer 104 telescopes over the forward end of the pivot, and it is held in assembled relation with that pivot by a cotter key 106. The wheel 102 will preferably be provided with a tire of rubber or other resilient material to avoid marking or scratching of the floor of the room in which the crib is used. A pin 108 is secured to the web of the wheel 102, and that pin is eccentric of the geometric center of that wheel.

A second pivot 110 is suitably mounted on the rear wall 86 of the motion-applying device, and that pivot receives a washer 112. A wheel 114 is rotatably mounted on the pivot 110, and it is held in assembled relation with the pivot 110 by a washer 116 and by a cotter key 117. The wheel 114 will preferably be provided with a tire of rubber or other material having a high coefficient of friction.

The numeral 118 denotes a bracket which is generally C-shaped in configuration but which has flanges that extend upwardly and downwardly from the arms of the C. Fasteners 120, shown in the form of self-tapping screws, extend through openings in the flanges on the bracket 118 and seat in openings in the wheel 114. A pin 122 is carried by the bracket 118, and that pin is eccentric of the geometric center of the wheel 114.

A connecting rod 124 has an opening at each end thereof, and one of those openings telescopes over the pin 122 while the other of those openings telescopes over the pin 108. The distance between the axis of the pin 122 and the axis of the pivot 110 must be less than the distance between the axis of the pin 108 and the axis of the pivot 100 to permit rotation of the wheel 114 to provide oscillation of the wheel 102.

The numeral 128 denotes a nut and bolt combination which is held by a resilient sleeve 130 that extends through an opening in the rear wall 86 of the motion-applying device, and that bolt and nut combination extends through an opening in a downwardly extending flange on a platform 134. The engagement between the sleeve 130 and the opening in the rear wall 86 is loose enough to permit gravity-induced rotation of the platform 134 relative to that opening. A similar resilient sleeve, not shown, is loosely mounted in an opening in the front wall 92; and a similar nut and bolt combination extends through that sleeve and through a flange at the front of the platform 134. A small motor 136 is fixedly mounted on the platform 134, as by nut and bolt combinations 138; and the weight of that motor coacts with the weight of the platform 134 to bias that platform for rotation in the counter clockwise direction.

A sleeve 140 of rubber or other material having a high coefficient of friction is snugly telescoped over the output shaft of the motor 136. That sleeve bears firmly against the tire of the wheel 114, and the resulting frictional engagement between the sleeve 140 and the tire of the wheel 114 is adequate to provide full driving of the wheel 114 by the motor 136.

The numeral 142 denotes still another pivot secured to the rear wall 86 of the motion-applying device; and that pivot telescopes through an opening in a wheel 144 and through washer 146. A cotter key 148 extends through a transverse opening in the pivot 142 and prevents accidental separation of the wheel 144 from that pivot. The wheel 144 is preferably equipped with a tire of rubber or other resilient material.

As shown particularly by FIG. 6, the axes of the wheels 102 and 144 are disposed below the level of the axis of the wheel 114. This enables the two wheels 102 and 144 to rest on the floor and to hold the wheel 114 out of engagement with that floor.

In the position shown in FIG. 6, the pin 122 is disposed directly below the pivot 110. As the shaft of the motor 140 rotates in the clockwise direction, it will cause the wheel 114 to rotate in the counter clockwise direction. This latter rotation will cause the pin 122 to move to the right and upwardly; thereby applying a pull on connecting rod 124 which causes that rod to move to the right and causes the pin 108 to move to the right and downwardly and to rotate wheel 102 in the clockwise direction. After the pin 122 and wheel 114 have rotated ninety degrees, the continued rotation of the wheel 114 in the counter clockwise direction applies a thrust to connecting rod 124 that forces the pin 108 to move to the left and thereby to cause the wheel 102 to start rotating in the counter clockwise direction. As the pin 122 moves through the next one hundred and eighty degrees in the counter clockwise direction it forces the pin 108 and wheel 102 to move to the left-hand ends of their paths of oscillation. During the remaining ninety degrees of the rotation of pin 122 in a revolution of the wheel 114, the pin 108 and wheel 102 will move in the clockwise direction to the positions shown in FIG. 6. Continued rotation of the wheel 114, by reason of continued rotation of the shaft of motor 136, will cause the wheel 102 to oscillate less than one hundred and eighty degrees; and that oscillation will be at a low speed because of the disparity between the diameters of sleeve 140 and wheel 114.

Figures 7, 8, 10:
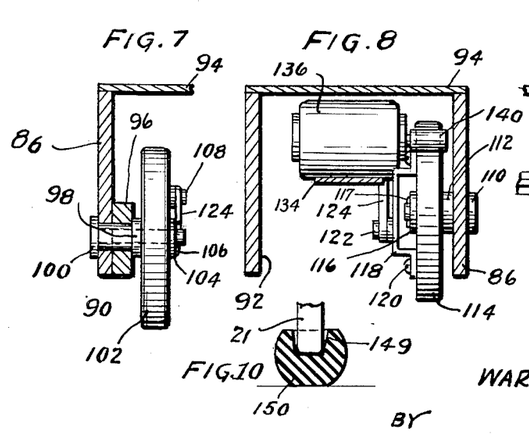
FIG. 7 is a sectional view through the motion-applying device of FIG. 6, and it is taken along the plane indicated by the line 7—7 in FIG. 6.
FIG. 8 is another sectional view through the motion-applying device of FIG. 6, and it is taken along the plane indicated by the line 8—8 in FIG. 6.
FIG. 10 is a sectional view through a resilient support for one of the legs of the cradle, crib or bed or the like, FIG. 11 is a wiring diagram of the electronic control device mounted in the control box shown in FIGS. 1 and 2.
Figure 9:
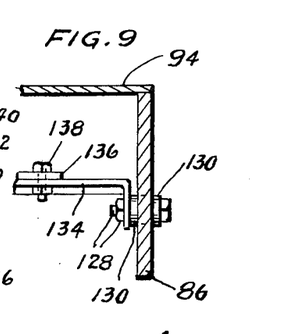
FIG. 9 is another sectional view through the motion-applying device of FIG. 6, and it is taken along the plane indicated by the line 9—9 in FIG. 6.

The recurrent oscillations of wheel 102 will force the rear wall 86 and the legs 21 to move from right to left and back again. This produces a gentle shifting of the one end of the cradle, crib or bed or the like; and the other end of the cradle, crib or bed or the like will be able to move sufficiently to accommodate such shifting because the bottoms of the legs 21 at that other end extend into sockets 149 in balls 150 of rubber or the like. Those balls will twist intermediate the bottoms thereof and the sockets 149 therein and thereby permit ready movement of the legs 21 at the other end of the cradle, crib or bed or the like.

The rockers 22 and 24, the gear motor housing 28, the connecting rod 38 and eye 40 provide a rocking of the crib about a horizontal axis. The motion applying housing of FIGS. 6–9 provides a rocking of the crib about a vertical axis. Hence, the user can, by proper selection, obtain whichever rocking action he desires.

Figures 11, 12, 13:
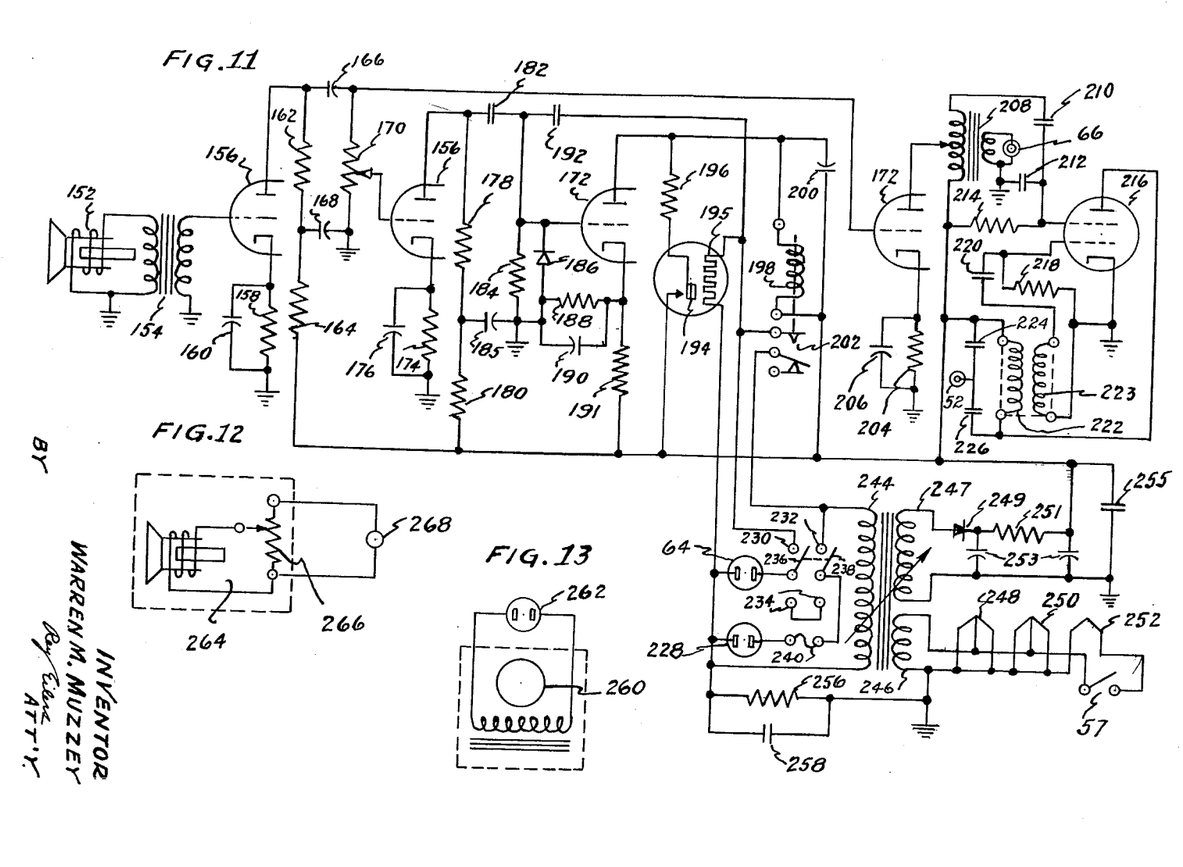

Turning to the control device which is shown in FIG. 11 and which is mounted in the control box 50, the numeral 152 denotes a permanent-magnet dynamic speaker of standard and usual construction. The leads of the voice coil of that speaker are connected to the primary winding of an audio transformer 154, and one of those leads is grounded. One end of the secondary winding of that transformer is grounded, and the other end of that secondary winding is connected to the grid of one section of a duo-triode 156. A resistor 158 and a condenser 160 are connected in parallel between the cathode of that section of the duo-triode and ground. The plate of that section of the duo-triode is connected to the lower supply by series-connected resistors 162 and 164.

The numeral 170 denotes the potentiometer operated by the knob 60 on control box 50; and one end of that potentiometer is capacitively coupled to the plate of the said section of duo-triode 156 by condenser 166, while the other end of that potentiometer is grounded. The condenser 166 is small, having a capacity of one thousandth of a microfarad in one preferred form of the control device of FIG. 11; and hence it limits the low frequency response of the control device. A bypass condenser 168 is connected between ground and the junction of resistors 162 and 164. The movable contact of potentiometer 170 is connected to the grid of the other section of duo-triode 156. A resistor 174 and a condenser 176 are connected in parallel between the cathode of that other section of the duo-triode and ground. The plate of that other section of duo-triode 156 is connected to the power supply by series-connected resistors 178 and 180.

A resistor 184 has one end thereof directly connected to the grid of one section of a duo-triode 172; and that grid is capacitively coupled to fixed contact 230, of the double pole, triple throw switch operated by handle 58 of control box 50, by a condenser 192 and is also capacitively coupled to the plate of the other section of duo-triode 156 by condenser 182. A bypass condenser 185 is connected between ground and the junction of resistors 178 and 180. A crystal rectifier 186 is connected between ground and the grid of the said section of duo-triode 172. A resistor 188 and a condenser 190 are connected in parallel between ground and the cathode of the said one section of duo-triode 172; and a resistor 191 is connected between that cathode and the power supply.

The plate of the said one section of duo-triode 172 is connected to the power supply through the coil 198 of a sensitive relay; and a series-connected resistor 196 and a normally-open timer contact 194 are connected in parallel with the relay coil 198. The contact 194 responds to heat from heat coil 195 to close and thereby shunt the relay coil 198, and in doing so it regulates the length of time the relay can remain energized. One end of the heat coil 195 is connected to the left-hand prong of male plug 228 while the other end of that heat coil is directly connected to the fixed contact of normally-open relay switch 202 and to fixed contacts 230. A condenser 200 is connected in parallel with the relay coil 198.

The movable contact of relay switch 202 is directly connected to fixed contact 232 of the said double pole, triple throw switch, and one end of the primary winding 244 of a power transformer is also directly connected to that fixed contact. The other end of that primary winding is connected to the left-hand prong of male plug 228. The right-hand prong of that male plug is connected to movable contact 238 of the double pole, triple throw switch by fuse 240, and the movable contact 236 of that switch is connected to the right-hand terminal of female receptacle 64. The fixed contacts 234 of that switch are bridged by a suitable conductor. The left-hand terminal of that female receptacle is connected to the left-hand prong of male plug 228.

The grid of the other section of duo-triode 172 is directly connected to the upper end of potentiometer 170. The cathode of that other section of duo-triode 172 is connected to ground by parallel-connected resistor 204 and condenser 206. The plate of that other section of duo-triode 172 is connected to the center tap of the primary winding of an audio frequency transformer 208. The lower end of that primary winding is directly connected to the power supply and the upper end of that winding is capacitively coupled to the screen grid of tetrode 216 by condenser 210. A resistor 214 is connected between that grid and the power supply, and a condenser 212 is connected between that grid and ground. The secondary winding of the transformer 208 has one end thereof grounded and has both leads thereof connected to the jack 66.

The cathode of the tetrode 216 is grounded; and a resistor 218 is connected between the grounded cathode and the control grid of that tetrode. A condenser 220 is connected between the control grid of the tetrode 216 and one end of an oscillator coil 223. The other end of that coil is grounded. Inductively coupled to the oscillator coil 223 is a variable inductance coil 222 that responds to rotation of the adjusting screw 54 on control box 50 to change its inductance. Series-connected condensers 224 and 226 are connected in parallel with coil 222, and the jack 52 is connected to the junction of those condensers. The upper end of the coil 222 is connected to the power supply while the lower end of that coil is connected to the plate of tetrode 216.

The power supply of the control device shown in FIG. 11 includes the low voltage secondary winding 246 which has the lower end thereof grounded and which is connected across the center-tapped filaments 248 and 250, respectively, of the duo-triodes 156 and 172. The winding 246 is also connectable across the filament 252 of the tetrode 216 whenever the single pole, single throw switch 57 is closed. That power supply also includes the high voltage secondary winding 247, and the lower end of that winding is grounded. The upper end of that winding is connected to a rectifier 249, preferably of the dry disc type, and that rectifier is connected to a filter which includes two condensers 253 and an intermediate resistor 251. A condenser 255 is connected in parallel with the output condenser 253; and a parallel-connected resistor 256 and condenser 258 are connected between ground and the left-hand prong on male plug 228.

The female receptacle 64 can receive the prongs of a plug 262 that is shown in FIG. 13. That plug is connected to the winding of a motor 260; and that motor could be the motor in the gear motor housing 28 of FIGS. 1 and 2, could be the motor 136 of FIGS. 6 and 8, or could be any other suitable motion-imparting motor. As a result, the control device of FIG. 11 can move a cradle, crib or bed or the like in the manner shown by FIGS. 1–3, in the manner shown by FIGS. 6–9, or in any other suitable manner.

The jack 66 can receive a plug 268 that is shown in FIG. 12. That plug is connected to the ends of a potentiometer 266; and one end and the movable contact of that potentiometer are connected to the voice coil of a permanent-magnet dynamic speaker 264 of standard and usual construction. The potentiometer 266 serves as a volume control. The leads which connect the plug 268 to the ends of the potentiometer 266 can be quite long and can permit the speaker 264 to be located in a room separate from the room in which the cradle, crib or bed or the like is located.

The control device shown in FIG. 11 can provide continuous movement of the cradle, crib or bed or the like, can provide timed movement of that cradle, crib or bed or the like, can provide timed movement of that cradle, crib or bed or the like plus an audible signal from speaker 264, or can provide timed movement of that cradle, crib or bed or the like plus an audible signal from a radio receiving set. The selection of the particular results provided by the control device of FIG. 11 is effected principally by shifting the switch handles 56 and 58. For example, if the handle 56 is shifted to open the switch 57, and if the handle 58 is shifted to move the contacts 236 and 238 into engagement with the bridged, fixed contacts 234, the motor 260 will run continuously. Specifically, when plug 228 is connected to a source of power, current will flow from the left-hand prong of plug 228 to the left-hand contact of receptacle 64, through the left-hand prong of plug 262, through motor 260, through the right-hand prong of plug 262, through the right-hand terminal of receptacle 64, through contact 236, through bridged contacts 234, through contact 238 and through fuse 240 to the right-hand prong of plug 228. Such a setting of handles 56 and 58 makes it possible to manually select and attain any desired period of time for the application of sleep-inducing movement to the cradle, crib or bed or the like.

If the handle 56 is shifted to open the switch 57, if the plug 268 is separated from the jack 66, and if the handle 58 is shifted to place movable contacts 236 and 238 in engagement with fixed contacts 230 and 232, respectively, the control device will respond to noises, made by the occupant of the cradle, crib or bed or the like, to operate the motor 260 for a predetermined period of time. Specifically, the secondary winding 246 will heat the filaments 248 and 250, and the secondary winding 247 will apply a positive voltage to the plates of the various sections of the duo-triodes 156 and 172. Those various sections will normally be non-conducting, and hence the relay coil 198 will normally be de-energized and will leave the relay switch 202 open.

If the occupant of the cradle, crib or bed or the like makes noises of a predetermined volume, and that volume can be determined by the setting of potentiometer knob 60, the speaker 152 will generate a signal that will render the first section of the duo-triode 156 conducting. That section will amplify that signal, and that signal will be coupled to the other section of that duo-triode and to the other section of duo-triode 172 by the RC network consisting of condenser 166 and potentiometer 170. Because the plug 268 is not in jack 66, and because switch 57 is open, the signal to the other section of duo-triode 172 can be ignored. The signal to the other section of the duo-triode 156 will be amplified by that section and coupled to the first section of the duo-triode 172 by the RC network including condenser 182 and resistor 184. The crystal rectifier circuit will clip the negative half cycles of the amplified signal, thereby providing positive signals for the grid of the first section of duo-triode 172. Those signals will render that section conducting, and thereupon the relay coil 198 will become energized and will close relay switch 202.

Current will then flow from the right-hand prong of plug 228, through fuse 240 and through contacts 238 and 232 to relay switch 202; and part of that current will flow through contacts 230 and 236, through female receptacle 64 and male plug 262 to motor 260 and to the left-hand prong of plug 228, while the rest of that current will flow through heat coil 195 to the left-hand prong of plug 228. The current through the motor will cause that motor to oscillate the cradle, crib or bed or the like. The current through the heat coil 195 will cause that coil to supply heat to the timer switch 194.

During the time the heat coil 195 is supplying heat to the timer switch 194, a small amount of alternating current flows from the right-hand prong of plug 228, through fuse 240, through contacts 238 and 232, through relay switch 202, through condenser 192, through crystal rectifier 186 to ground and then through condenser 258 to the left-hand prong of plug 228. The crystal rectifier rectifies that alternating current and applies the resulting direct current voltage to the grid of the first section of the duo-triode 172, thereby keeping that section conducting even if the occupant of the cradle, crib or bed or the like becomes silent. In this way, the relay coil 198 can be kept energized until the timer switch 194 closes in response to heat from the heat coil 195.

When the heat supplied by the heat coil 195 to the timer switch 194 is great enough, that switch will close and shunt relay coil 198, thereby permitting relay switch 202 to re-open. The re-opening of relay switch 202 will de-energize motor 260, will de-energize heat coil 195, and will interrupt the flow of alternating current from plug 228 through rectifier 186. Consequently, if no further noises are made by the occupant of the cradle, crib or bed or the like, there will be no voltage on the grid of the first section of duo-triode 172 to keep that section conducting, and that section will not reenergize relay coil 198.

The overall result is that the noises made by the occupant of the cradle, crib or bed or the like automatically start the motor 260; and that motor will continue to run for a predetermined period of time. That period of time will usually be about five minutes, and it will usually be long enough to induce sleep for the occupant of the cradle, crib or bed or the like. If the said occupant does go back to sleep, the control device will permit the motor 260 to remain de-energized until such time as the said occupant again awakens and again makes noises.

If the sleep-inducing gentle movement provided by the motor 260 does not cause the occupant of the cradle, crib or bed or the like to go back to sleep, and if that occupant continues to make noises, the control device will re-energize the relay coil 198 as soon as the timer switch 194 cools sufficiently to re-open. Thereupon the relay switch 202 will again be closed and the motor 260 and the heat coil 195 will again be energized. The motor 260 will supply sleep-inducing gentle movement to the cradle, crib or bed or the like until the timer switch 194 closes once again. Because of the residual heat in the heat coil 195 and in the timer switch 194, the latter will provide a time cycle of shorter duration. If the second application of sleep-inducing gentle movement causes the occupant of the cradle, crib or bed or the like to go back to sleep, the control device will permit the motor 260 to remain de-energized. However, if that second application of sleep-inducing gentle movement does not cause the said occupant to go back to sleep, the control device will provide further applications of sleep-inducing gentle movement until the occupant of the cradle, crib or bed or the like either goes back to sleep or summons someone who can shift the handle 58 to the "off" position.

If the handle 56 is shifted to open the switch 57, if the plug 268 is inserted in the jack 66, and if the handle 58 is shifted to place movable contacts 236 and 238 in engagement with fixed contacts 230 and 232, respectively, the control device will not only respond to noises, made by the occupant of the cradle, crib or bed or the like, to start the motor 260 but will also cause the speaker 264 to reproduce those noises. The starting, running and timing of the motor 260 will be effected by the application of the amplified and rectified signals to the grid of the first section of duo-triode 172, all as explained above. The reproduction of signals by the speaker 264 will be effected by coupling the output of the first section of duo-triode 156 to the grid of the other section of duo-triode 172, and then having that other section of duo-triode 172 drive the speaker 264.

Specifically, condenser 166 and potentiometer 170 couple the output of the first section of duo-triode 156 to the grid of the other section of duo-triode 172. That other section of duo-triode 172 then amplifies the signal and applies it to the primary winding of output transformer 208. The secondary winding of that transformer is connected to and drives the voice coil of speaker 264.

The potentiometer 170 will usually be set so an appreciable volume of noise must be made by the occupant of the cradle, crib or bed or the like before the other section of duo-triode 152 becomes conducting. Such an arrangement means that the other section of duo-triode 156 need not become conducting whenever the first section of that duo-triode becomes conducting, and hence the motor 260 need not become energized whenever that first section of duo-triode 156 becomes conducing. In contrast, however, the other section of duo-triode 172 will become conducting whenever the first section of duo-triode 156 becomes conducting; and this is desirable because it enables the speaker 264 to reproduce all noises made by the occupant of the cradle, crib or bed or the like. The volume of the reproduced noises can be regulated by adjusting the setting of the potentiometer 266.

If the handle 56 is shifted to close the switch 57, if the plug 268 is separated from the jack 66, if a wire-bearing plug is inserted in jack 52, and if the handle 58 is shifted to place movable contacts 236 and 238 in engagement with fixed contacts 230 and 232, respectively, the control device will not only respond to noises, made by the occupant of the cradle, crib or bed or the like, to start the motor 260 but will also cause a radio receiving set to reproduce those noises. That radio receiving set should be tuned to a portion of its band which is normally quiet, and the adjusting screw 54 should be rotated to cause the tetrode 216 to oscillate at the frequency to which the radio receiving set has been tuned; and both of these results are easily attained.

The starting, running and timing of the motor 260 will be effected by the application of the amplified and rectified signals to the grid of the first section of duo-triode 172, all as explained above. The reproduction of the signals by the radio receiving set will be effected by coupling the output of the first section of duo-triode 156 to the grid of the other section of duo-triode 172 and by using the output of that section of duo-triode 172 to modulate the radio frequncy signal generated by tetrode 216. The modulated signal will then be radiated by the wire carried on the plug in jack 52 and will be detected and reproduced by the radio receiving set.

Specifically, the coil 222 and the condensers 224 and 226 constitute a resonant circuit in the plate circuit of tetrode 216; and the coil 222 inductively feeds a signal to the coil 223 which is capacitively coupled to the grid of tetrode 216 by condenser 220. As a result, tetrode 216 oscillates and generates a radio frequency signal that can have its frequency varied by adjusting the screw 54 on control box 50. When a noise is picked up by speaker 152 and amplified by the first section of duo-triode 156 and again amplified by the second section of duo-triode 172, the resulting audio frequency signal will be applied to the screen grid of tetrode 216 and will modulate the radio frequency signal generated by that tetrode. The antenna-like wire on the plug in jack 52 will radiate the modulated signal; and the radio receiving set will pick it up, detect it, and reproduce it, thereby enabling a person in a distant room to hear all noises made by the occupant of the cradle, crib or bed or the like.

The output of the tetrode 216 will be relatively small, and the efficiency of the antenna-like wire on the plug in jack 52 will be relatively low; and hence the modulated signal will not interfere with the radio reception in adjacent homes or in adjacent apartments in an apartment building. The volume of the reproduced signals can be regulated by adjusting the volume control of the radio receiving set.

The control device of FIG. 11 is extremely versatile; being usable with the motion-imparting mechanisms of FIGS. 1 and 2 or FIGS. 6–9. Further, that control device can provide continuous, manually-regulated operation of those mechanisms, can provide automatic operation of those mechanisms, can provide automatic operation of those mechanisms plus an audible signal in a remotely located loudspeaker, and can provide automatic operation of those mechanism plus an audible signal in a radio receiving set. However, if all of these features are not desired, the control device of FIG. 11 can be materially simplified. For example, if the feature of providing an audible signal in a radio receiving set is not desired, tetrode 216, resistor 218, condensers 220, 224 and 226, coils 222 and 223, jack 52 and switch 57 can be eliminated. Further, if the feature of providing an audible signal in a remotely located loudspeaker is not desired, the other section of duo-triode 172, resistor 204, condensers 206, 210 and 212, transformer 208 and jack 66 can be eliminated.

Figure 14:
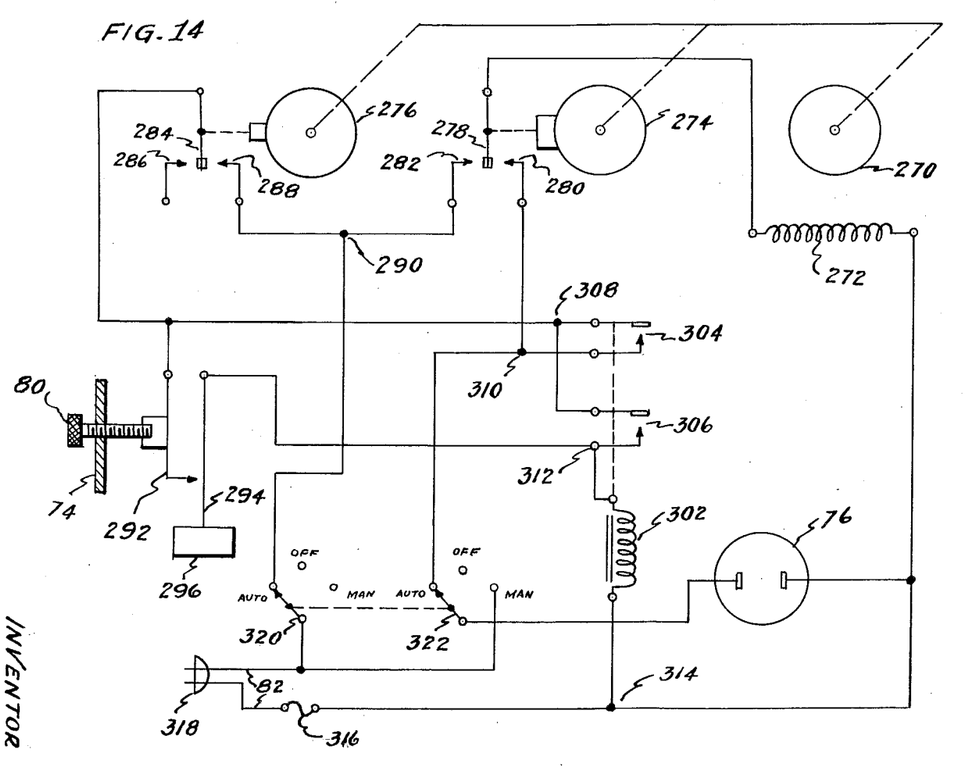
FIG. 14 is a schematic diagram of a control device that can be used in the control box of FIGS. 4 and 5.

In FIG. 14, a less expensive and simpler control device is shown, and that control device can be mounted in the control box 74 of FIGS. 4 and 5. That control device includes a motor which has a rotor 270 and a winding 272. That motor will preferably be a synchronous motor so it can provide predictable and reliable timing for the control device. A cam 274 is mounted on the output shaft of the motor, and a second cam 276 is also mounted on that shaft. The cam 274 has a wide lobe whereas the cam 276 has a narrow lobe; and the cams will be suitably mounted on the shaft so they cannot rotate relative to that shaft.

A switch contact 278 is mounted adjacent, and is moved by, the lobe on the cam 274; and that contact normally engages fixed contact 280 but can be shifted into engagement with fixed contact 282 by the lobe on cam 274. A switch contact 284 is located adjacent, and is moved by, the lobe on the cam 276, and that contact normally engages the fixed contact 288 but can be shifted into engagement with fixed contact 286 by the lobe on cam 276. The contacts 278, 280, 282, 284, 286 and 288 will preferably be the contacts of enclosed, snap-acting switches, and they are merely shown in diagrammatic form for the sake of clarity.

A junction 290 is provided between the fixed contact 282 and the fixed contact 288, and that junction is connected to the "Auto" terminal of a three position selector switch. The other two positions of that switch are "Off" and "Man"; the latter position providing for manual control of the control device. The movable contact 284 is connected to an adjustable contact 292 of an inertia switch. That switch has a movable contact 294 which carries a depending weight 296; and the set screw 80 of the control box 74 is positioned adjacent the adjustable contact 292 and is rotatable to adjust the sensitivity of the inertia switch. The movable contact 294 is normally held out of engagement with adjustable contact 292 by the weight 296; and therefore a certain amount of movement must be imparted to the control box 74 to cause the inertia switch to close. The movable switch contact 284 is also connected to the movable contacts of relay switches 304 and 306. Those relay switches have movable contacts that are normally held out of engagement with the fixed contacts but that respond to energization of the relay coil 302 to move into engagement with those fixed contacts. The fixed contact of relay switch 304 is connected to fixed contact 280 and is also connected to the "Auto" contact of a three position selector switch 322 that is "ganged" to the switch 320. The "ganged" switches are operated by the handle 78 on the control box 74. The other positions of switch 322 are "Off" and "Man."

When the handle 78 is in its upper position, the switches 320 and 322 are in the positions shown by FIG. 14. When that handle is in its lower position, those switches will be in the "Man" positions, and when that handle is in the position shown in FIGS. 4 and 5 those switches will be "Off."

A junction 312 connects the fixed contact of the relay switch 306 to the upper end of relay coil 302 and to the movable contact 294 of the inertia switch. A junction 314 connects the lower end of relay coil 302 to the right-hand contact of female receptacle 76, to the motor winding 272, and through fuse 316 and one lead 82 to one prong of plug 318. The other prong of that plug is connected by the other lead 82 to the movable contact of switch 320 and to the "Man" contact of switch 322. Plug 318 will be inserted in a socket and thereby connected to a source of one hundred and fifteen volt alternating current.

In using the control device of FIG. 14, a male plug that is connected to a motor is inserted in the female receptacle 76. That motor can be the motor in the gear motor housing 28 of FIGS. 1 and 2, can be the motor 136 of FIGS. 6 and 8, or can be any other suitable motion-applying motor. Thereafter the handle 78 will be shifted from "Off" to "Auto" or "Man." If that handle is shifted to the "Man" position, current will flow from the lower prong of plug 318 through the lower lead 82, through fuse 316, past junction 314, through the right-hand terminal of receptacle 76, through the motor, not shown, through the left-hand terminal of receptacle 76, through switch 322 and through the upper lead 82 to the upper prong of plug 318. That current will energize the motor, and that motor will apply sleep-inducing gentle movement to the cradle, crib or bed or the like until the handle 78 is moved out of the "Man" position.

If the handle 78 is moved upwardly to the "Auto" position, it will cause the switches 320 and 322 to assume the positions shown in FIG. 14. No current will flow in the control device at this time because the inertia switch is open. However, when the occupant of the cradle, crib or bed or the like moves sufficiently to cause the movable contact 294 to engage the adjustable contact 292 of the inertia switch, current will flow from the upper prong of the plug 318 through switch 320, past junction 290, through the contacts 288 and 284, through the contacts 292 and 294, past junction 312, through relay coil 302, past junction 314, and then through the fuse 316 to the lower prong of plug 318. That current will energize relay 302; and that relay will remain energized because of a holding circuit which extends from the lower prong of plug 318 through fuse 316, past junction 314, through relay coil 302, past junction 312, through now-closed relay switch 306, through contacts 284 and 288, past junction 290 and through switch 320 to the upper prong of plug 318. The resulting continued energization of relay 302 enables current to flow from the lower prong of plug 318 through fuse 316, past junction 314, through the right-hand terminal of female receptacle 76, through the motor, not shown, through the left-hand terminal of receptacle 76, through switch 322, past junction 310, through the now-closed relay switch 304, past junction 308, through the contacts 284 and 288, past junction 290, and through switch 320 to the upper prong of plug 318. Thereupon the motor, not shown, will begin to run and apply sleep-inducing gentle movement to the cradle, crib or bed or the like. A second motor starting circuit is closed when the relay 302 is energized; and that circuit extends from the lower prong of plug 318 through fuse 316, past junction 314, through motor winding 272, through contacts 278 and 280, through the now-closed relay switch 304, past junction 308, through contacts 284 and 288, past junction 290 and through switch 320 to the upper prong of plug 318. Consequently, the energization of relay coil 302 causes three circuits to close.

As the rotor 270 rotates, it will cause the lobe on cam 274 to shift movable contact 278 out of engagement with fixed contact 280 and into engagement with fixed contact 282. However, the initial position of that cam is just beyond the contact 278; and hence the rotor 270 must rotate the output shaft of the motor through the greatest part of a revolution before the lobe of cam 274 engages and moves contact 278. Upon such engagement and movement, a running circuit is established for the motor winding 272; that circuit extending from the lower prong of plug 318 through fuse 316, past junction 314, through winding 272, through contacts 278 and 282, past junction 290 and through switch 320 to the upper prong of plug 318. Shortly thereafter, the lobe on cam 276 will shift contact 284 out of engagement with contact 288 and into engagement with contact 286; and thereupon relay 302 will become de-energized and will cause relay switch 304 to open and de-energize the motor connected to female receptacle 76 and will also cause relay switch 306 to open and break the holding circuit of relay coil 302. Consequently, the motion-applying motor will come to rest and the cradle, crib or bed or the like will also come to rest.

However, the rotor 270 will continue to run for a short time because the circuit established by the contacts 278 and 282 is independent of the relay switches 304 and 306. Shortly thereafter, the lobe of cam 276 will move out of engagement with contact 284 so that contact can re-engage the contact 288; and if the occupant of the cradle, crib or bed or the like has gone to sleep and is quiet, the relay coil 302 will not be re-energized because the inertia switch will be open and the holding circuit for the relay coil 302 will also be open. Further rotation of the output shaft by the rotor 270 will cause the lobe on cam 274 to move out of engagement with contact 278 and permit that contact to re-engage contact 280. In moving out of engagement with contact 282, contact 278 will break the running circuit of the motor winding 272 and will permit rotor 270 to come to rest. If, at the time the lobe on cam 276 permitted contacts 284 and 288 to reengage, the occupant of the cradle, crib or bed or the like was still awake and was moving around sufficiently to close the inertia switch, that switch would reenergize the relay coil 302; and thereupon the control device would go through another cycle.

One particular advantage in having the cam 274 is that it enables the cradle, crib or bed or the like to come to rest before the inertia switch can again be connected in series relation with the relay coil 302. In the absence of cam 274, it would be necessary to provide a very coarse setting of the inertia switch so the rocking of the cradle, crib or bed or the like would not cause the inertia switch to close and re-cycle the control device. With the time delay provided by the cam 274, it is possible to use a very "fine" setting of the inertia switch; and such a setting is far more desirable than a coarse setting.

Figure 15:
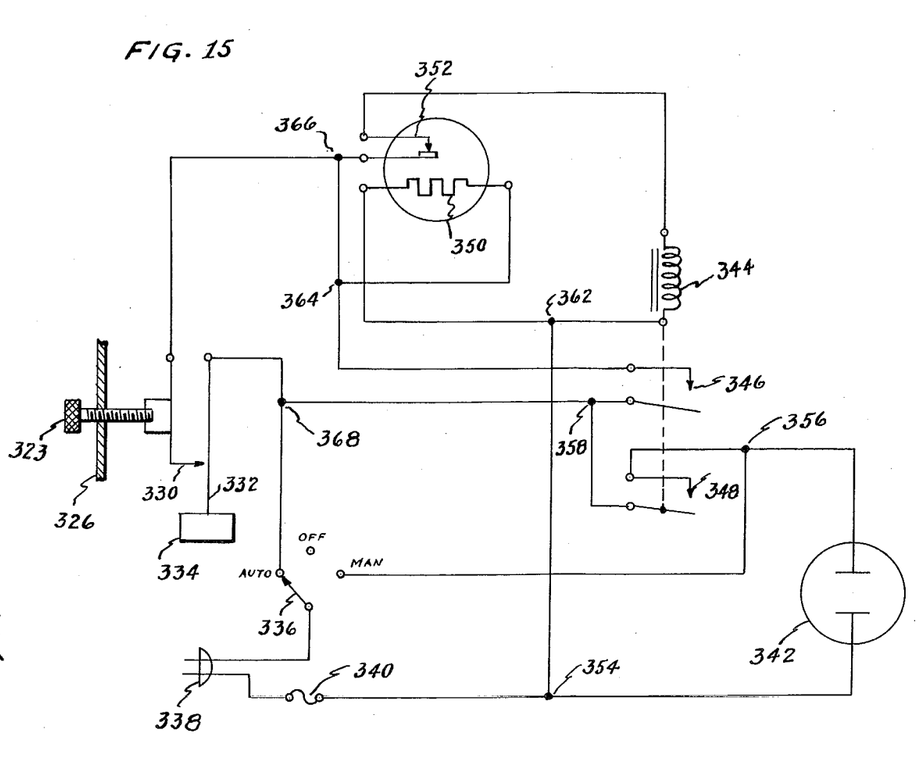
FIG. 15 is a schematic diagram of another control device that can be used in the control box of FIGS. 4 and 5.

FIG. 15 shows another control device that can be mounted in the control box 74 or in a control box 326 similar to that control box; and that control device has an adjusting screw 328 rotatably mounted in one wall of the control box 326. The screw 328 controls the normal position of the adjustable contact 330 of an inertia switch. That switch has a movable contact 332, and a weight 334 is secured to the lower end of that movable contact; and that weight normally holds contact 332 out of engagement with contact 330.

A junction 368 connects contact 332 to the "Auto" contact of a three position selector switch 336 and also connects that contact to a junction 358. That junction, in turn, is connected to the movable contacts of relay switches 346 and 348. The contact 330 is connected to relay coil 344 by a heat-responsive switch 352 that is normally closed. A heat coil 350 is connected in parallel with the relay coil 344, and that heat coil can supply heat to the swtich 352. A female receptacle 342 is connected to one prong of plug 338 and is also connected to the "Man" contact of switch 336 and to the fixed contact of relay switch 348.

Figure 6:
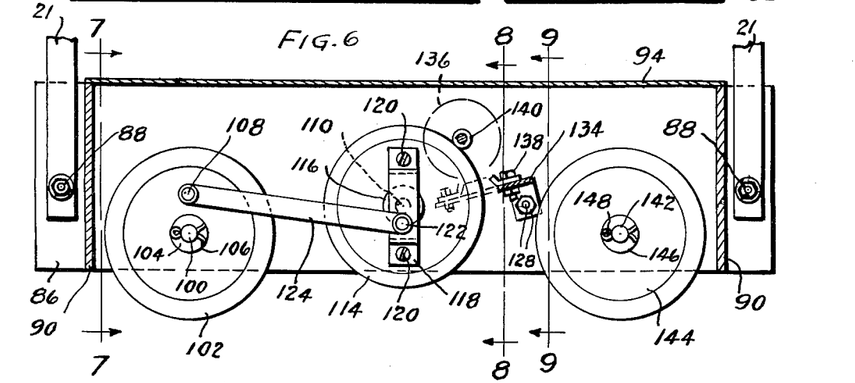
FIG. 6 is a sectional view in elevation of one form of motion-applying device provided by the present invention.

In using the control device of FIG. 15, a male plug that is connected to a motor is inserted in the receptacle 342; and that motor can be the motor in gear housing 28 of FIGS. 1 and 2, can be the motor 136 of FIGS. 6 and 8, or can be any other suitable motion-applying motor. Thereafter the handle of the switch 336 will be shifted from "Off" to "Auto" or "Man." If that handle is shifted to the "Man" position, current will flow from the lower prong of plug 338 through fuse 340, past junction 354, through the lower terminal of receptacle 342, through the motor, through the upper terminal of receptacle 342, past junction 356 and through switch 336 to the upper prong of plug 338. The resulting energization of the motor will continue until the handle of switch 336 is shifted out of the "Man" position.

If the handle of switch 336 is shifted to the "Auto" position, and if the occupant of the cradle, crib or bed or the like thereafter moves sufficiently to cause the contact 332 to engage the contact 330, current will flow from the upper prong of plug 338 through switch 336, past junction 368, through contacts 332 and 330, past junction 366, through switch 352, through relay coil 344, past junction 362, past junction 354 and through fuse 340 to the lower prong of plug 338. The relay coil 344 will close relay switches 346 and 348; and coil 344 will be kept energized by means of a holding circuit which extends from the lower prong of plug 338 through fuse 340, past junction 354, past junction 362, through relay coil 344, through switch 352, past junction 366, past junction 364, through now-closed relay switch 346, past junction 358, past junction 368, and through the switch 336 to the upper prong of plug 338. The closing of relay switch 346 also completed a circuit for the heat coil 350, that circuit extending from the lower prong of plug 338 through fuse 340, past junction 354, past junction 362, through heat coil 350, past junction 364, through relay switch 346, past junction 358, past junction 368 and through switch 336 to the upper prong of plug 338; and the closing of relay switch 348 completed a circuit for the motion-applying motor, that circuit extending from the lower prong of plug 338 through fuse 340, past junction 354, through the lower terminal of receptacle 342, through the motor, through the upper terminal of receptacle 342, past junction 356, through relay switch 348, past junction 358, past junction 368 and through switch 336 to the upper prong of plug 338. Current will then flow through relay coil 344, through heat coil 350, and through the motor.

After a predetermined length of time, the switch 352 will respond to the heat coil 350 and will open, thereby de-energizing the relay coil 344. The de-energization of that relay coil will permit the relay switch 348 to reopen and de-energize the motor, it will also permit relay switch 346 to reopen and de-energize heat coil 350 and also to break the holding circuit of relay coil 344. If the occupant of the cradle, crib or bed or the like has gone back to sleep and is quiet, the control device will remain inactive. However, if the occupant of the cradle, crib or bed or the like is still awake and is still restless, a further closing of the inertia switch will re-energize the relay coil 344 and provide another cycling of the control device of FIG. 15 as soon as the switch 352 has cooled sufficiently to re-close. Any such second cycle will be shorter than the first cycle because of the residual heat in heat coil 350 and in switch 352.

The control device of FIG. 15 is interchangeable with the control device of FIG. 14; and a motor-driven timer similar to that of FIG. 14 could be substituted for the thermal timer in FIG. 11. In addition, a microphone could be substituted for the speaker 152 in FIG. 11.

Whereas the drawing and accompanying description have shown and described several preferred embodiments of the present invention it should be apparent to those skilled in the art that various changes may be made in the form of the invention without affecting the scope thereof.

What I claim is:

1. A device that can impart sleep-inducing gentle movement to a crib or bed comprising an electric motor, an eccentric driven by said motor, a connecting rod that is driven by said eccentric and that is connected to said crib or bed and applies oscillatory forces thereto, a source of electrical energy and a circuit connecting said source to said motor, a switch in said circuit, a sound responsive electronic derive connected to said switch to close the same and permit energization of said motor, a timer in said circuit that maintains said motor energized for a predetermined length of time, said electronic device including a sensitivity control that predetermines the volume of the sound to which said electronic device can respond and cause actuation of said switch to keep said motor energized.

2. A device that can impart sleep-inducing gentle movement to a crib or bed comprising an electric motor, a motion-translating mechanism that is connectable to the shaft of said motor to enable rotation of said shaft to apply oscillatory forces to said crib or bed, a source of electrical energy and a circuit connecting said source to said motor, a switch in said circuit, a sound responsive electronic device connected to said switch to close the same and permit energization of said motor, a timer in said circuit that maintains said motor energized for a predetermined length of time, said electronic device including a sensitivity control that predetermines the volume of the sound to which said electronic device can respond and cause actuation of said switch to keep said motor energized.

3. A device that can impart sleep-inducing gentle movement to a crib or bed comprising an electric motor, a motion-translating mechanism that is connectable to the shaft of said motor to enable rotation of said shaft to apply oscillatory forces to said crib or bed, a circuit that can connect said motor to a source of electrical energy, a switch in said circuit, a sound responsive electronic device connected to said switch to close the same and permit energization of said motor, and a timer in said circuit that maintains said motor energized for a predetermined length of time, said sound responsive electronic device including a channel which is adapted to respond to actuation of said sound responsive electronic device to pass signals to a remote sound-producing device.

4. A device that can impart sleep-inducing gentle movement to a crib or bed comprising an electric motor, a motion translating mechanism that is connectable to the shaft of said motor to enable rotation of said shaft to apply oscillatory forces to said crib or bed, a circuit connecting said motor to a source of electrical energy, a vibration responsive device in said circuit that is normally open but that can be closed to permit energization of said motor, a timer that maintains said motor energized for a predetermined length of time, and a sensitivity control in said circuit that predetermines the amplitude of the vibrations to which said circuit is energized to cause actuation of said motor.

5. A device as defined in claim 4, said vibration responsive device comprising an inertia switch.

6. A device as defined in claim 4, said vibration responsive device comprising a switch and a sound responsive device connected to said switch.

References Cited in the file of this patent

UNITED STATES PATENTS

| | | |
|---|---|---|
| 779,179 | Perotti | Jan. 3, 1905 |
| 1,662,754 | Millard | Mar. 13, 1928 |
| 2,221,963 | Case et al. | Nov. 19, 1940 |
| 2,688,323 | Miller | Sept. 7, 1954 |
| 2,765,478 | Pinto | Oct. 9, 1956 |
| 2,821,191 | Paii | Jan. 28, 1958 |

OTHER REFERENCES

Allied Radio Catalog 180, 1959.